United States Patent
Zachariades et al.

(10) Patent No.: US 8,883,302 B2
(45) Date of Patent: Nov. 11, 2014

(54) ABRASION RESISTANT CORDS AND ROPES

(75) Inventors: Nina Zachariades, Hillsborough, CA (US); Dimitris J. Zachariades, Hillsborough, CA (US); Anagnostis E. Zachariades, Hillsborough, CA (US)

(73) Assignee: Polteco, Inc. CA (US)

(*) Notice: Subject to any disclaimer, the term of this patent is extended or adjusted under 35 U.S.C. 154(b) by 126 days.

(21) Appl. No.: 13/095,166

(22) Filed: Apr. 27, 2011

(65) Prior Publication Data

US 2011/0197564 A1    Aug. 18, 2011

Related U.S. Application Data

(63) Continuation-in-part of application No. 12/579,344, filed on Oct. 14, 2009.

(60) Provisional application No. 61/107,864, filed on Oct. 23, 2008, provisional application No. 61/218,875, filed on Jun. 19, 2009.

(51) Int. Cl.

| | |
|---|---|
| *B32B 19/00* | (2006.01) |
| *B32B 1/04* | (2006.01) |
| *D02G 3/02* | (2006.01) |
| *B32B 27/02* | (2006.01) |
| *D07B 1/14* | (2006.01) |
| *B32B 27/32* | (2006.01) |
| *B32B 5/26* | (2006.01) |
| *D07B 1/02* | (2006.01) |
| *B32B 27/12* | (2006.01) |

(52) U.S. Cl.
CPC . *B32B 5/26* (2013.01); *B32B 27/02* (2013.01); *D07B 1/147* (2013.01); *D07B 2205/2014* (2013.01); *B32B 27/32* (2013.01); *D07B 2201/2003* (2013.01); *D07B 2201/209* (2013.01); *D07B 2201/2092* (2013.01); *D07B 1/025* (2013.01); *B32B 27/12* (2013.01)
USPC ............. 428/357; 428/68; 428/76; 57/210

(58) Field of Classification Search
CPC .......... D02G 3/36; D02G 3/442; D04H 1/42; D01F 6/46
USPC ............ 57/7, 32, 295, 297, 210, 232–235; 428/68, 76, 357
See application file for complete search history.

(56) References Cited

U.S. PATENT DOCUMENTS

| | | | |
|---|---|---|---|
| 4,534,163 A | 8/1985 | Schuerch | |
| 4,587,163 A | 5/1986 | Zachariades | |
| 4,917,700 A | 4/1990 | Aikins | |
| 5,302,453 A * | 4/1994 | Kouno et al. | ................. 428/364 |

(Continued)

FOREIGN PATENT DOCUMENTS

| | | |
|---|---|---|
| JP | 10-251984 A | 9/1998 |
| JP | 11-293574 A | 10/1999 |
| WO | 9850621 A1 | 11/1998 |

OTHER PUBLICATIONS

Sloan et al.,"Design Modifications to Increase Fatigue Life in Fiber Ropes", Oceans. 1. (2005): 829-835.

*Primary Examiner* — Jennifer Chriss
*Assistant Examiner* — Ricardo E Lopez
(74) *Attorney, Agent, or Firm* — Edward S. Sherman

(57) ABSTRACT

The abrasion resistance of organic fiber based ropes and cords is increased by a outer woven cover of tapes of high molecular weight and more preferably ultrahigh molecular weight polyethylene.

10 Claims, 9 Drawing Sheets

(56) References Cited

U.S. PATENT DOCUMENTS

| | | | |
|---|---|---|---|
| 5,407,623 A * | 4/1995 | Zachariades et al. | 264/119 |
| 5,479,952 A | 1/1996 | Zachariades | |
| 5,702,657 A * | 12/1997 | Yoshida et al. | 264/112 |
| 2005/0069703 A1 * | 3/2005 | He et al. | 428/395 |

* cited by examiner

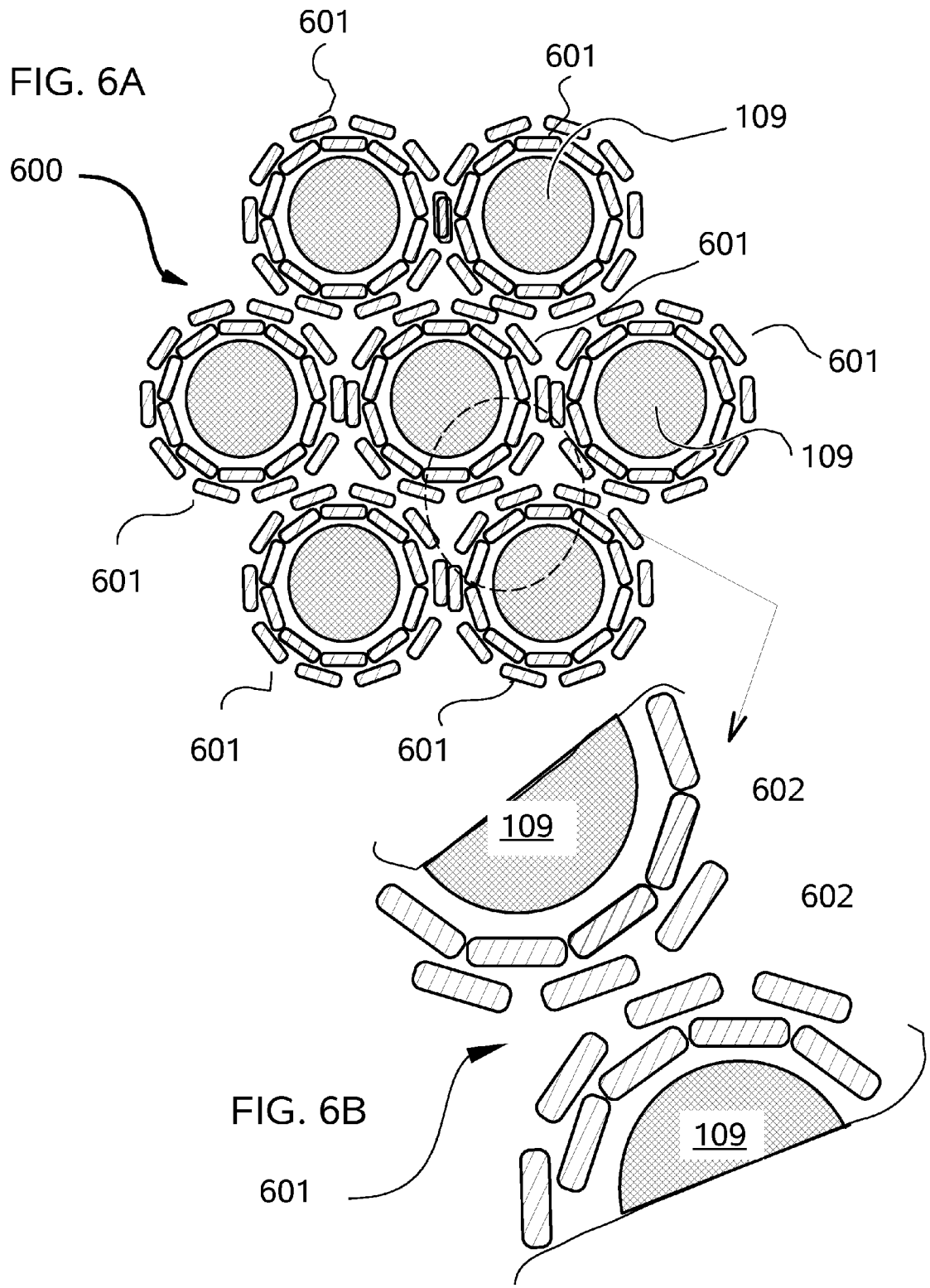

ABRASION RESISTANT CORDS AND ROPES

CROSS REFERENCE TO RELATED APPLICATIONS

The present application is a Continuation-In-Part of and claims the benefit of priority to the US Non-provisional patent application having the same title and application Ser. No. 12/579,344 that was filed on Oct. 14, 2009, which is incorporated herein by reference.

The present application claims the benefit of priority to the US provisional patent application of the same title having application Ser. No. 61/107,864 that was filed on Oct. 23, 2008, which is incorporated herein by reference.

The present application also claims the benefit of priority to the US provisional patent application of the same title having application Ser. No. 61/218,875 that was filed on Jul. 19, 2009, which is incorporated herein by reference.

BACKGROUND OF INVENTION

This invention relates to a covering device and a covering material comprising high or ultra high molecular weight polyethylene (UHMWPE). The invention is also directed to cord-like devices such as ropes, cords, cables, conduits, strands of fibers and tapes, etc. comprising the covering device or the covering material mentioned above with superior abrasion resistance, reduced weight and diameter.

New ropes are continually being developed to meet the needs of specialized applications. Through rope engineering, it is possible to design a rope with specific performance characteristics. These characteristics are met by changing materials and construction methods. Decisions as to what factors are important must be made.

In a practical sense, advantages and disadvantages must be traded off and compromises must be made to design the best rope for a given application.

Some applications require: Strong low-elongation, light weight and high abrasion resistance ropes for rescue; Shock-absorbing ropes for the rock climber; Floating ropes for marine uses and river rescue; Low-elongation, shock absorbing ropes for caving and arborists; Soft responsive rappel ropes; Colored rope for multi-rope management challenges; and Superior strength, non stretching buoyant ropes for marine applications.

In general, ropes are constructed with multifilament fibers in three strands twisted together or in various braided forms. The various multifilament fibers used in rope manufacturing are predominantly synthetic and made of polymers such as polyamides (e.g. Nylon), polyesters (e.g. Dacron®, polypropylene, polyethylene (e.g. Dyneema® and Spectra®), aromatic polyamides (e.g. Kevlar®, Twaron®) and aromatic co-polyesters (e.g. Vectran®).

Depending on the intended purpose of the rope, different polymer fibers are used; polyamides for their stretching and shock absorbing capability, polyesters for their UV and abrasion resistance, polypropylene for its lightness and low cost, polyethylene and aromatic polyamides for their high strength and low extension.

However, these commonly used rope fibers also have certain disadvantages that are associated with their particular chemical structures. Polyamides and to a lesser extent polyesters absorb water, polyamides and polypropylene are susceptible to UV degradation, and aromatic polyamides are susceptible to fatigue bending.

Also, whereas some of the rope fibers have higher abrasion resistance than others, e.g. polyesters over polyamides, ultra high molecular weight polyethylene over aromatic polyamides, all rope fibers are made of bundles of multifilament fibers that is structures that are produced to have a high degree of chain orientation and extension and be strong in their axis direction. As a result they are very weak in their lateral directions perpendicular to their axis. For example, in high strength polyethylene fibers, the molecular chains are held by weak van der Waals forces in the lateral directions. Because of the very weak lateral bonding between the filaments of multifilament fibers, when ropes made of multifilament fibers are rubbed against other materials encountered during their use, for example, rocks, stones, cement, and salt crystals, their filaments shred and break down into weaker microfilaments, a process that leads to the weakening and destruction of the rope. The greater the degree of shredding and break down of filaments and fibers the greater the destruction of the rope.

In order to obtain the benefit of individual polymer properties and manage the cost of the ropes particularly those containing the costly high strength fibers of ultra high molecular weight polyethylene and aromatic polymers, manufacturers combine different polymer fibers for the construction of hybrid ropes, for example a high strength ultra high molecular weight polyethylene or aromatic polyamide as a core with a less expensive polyamide, a UV resistant polyester or a light weight polypropylene as a braided outside layer to protect the high strength core component.

This outside layer, or protective cover, is used to protect the high strength performance core component for reasonable lengths of time, and is used in proportions of 40-60% of the total weight of the rope for example. It contributes a significant amount to the weight of the rope for the role of protection as well as to the overall volume of the rope, as the diameter is typically substantially larger than that of the core component. This protective layer can make the rope heavier, bulkier and more difficult to handle.

Prior art shows various other efforts to improve the abrasion resistance and hence the service life of the ropes. For example, U.S. Pat. No. 4,534,163 (Issued to Schuerch on Aug. 13, 1985) shows the use of a urethane coating to impregnate a polyethylene terephthalate fabric in the form of strips wound around the core fibers and curing it to form a protective jacket for abrasion. Polyurethanes are thermoplastic elastomers and may exhibit better abrasion resistance over other rubbery materials, however they fracture into debris between the fibers and can contribute in the destruction of the fibers (Sloan, F., S. Bull, and R. Longerich. "Design Modifications to Increase Fatigue Life of Fiber Ropes." Oceans. 1. (2005): 829-835). Such failure mechanism shows that polyurethanes provide a limited benefit as a coating and a binder. Moreover, the addition of polyurethane to form a protective jacket results in additional weight and larger volume, i.e. the rope becomes heavier and larger in diameter. PCT Patent Application no. WO 98/50621 (to Moraes Del Vecchio et al., published Nov. 12, 1998) reports (page 2, line 25-page 3, line 12) that the application of polyurethane coatings has been tested and found to have also other disadvantages, e.g. detachment, concentration of stresses and strength reduction and manufacturing problems.

WO 98/50621 shows another approach to improve the internal abrasion of the core fibers by using underneath the outside braided protective layer a polyethylene strip placed helically on the core fibers in order to prevent seabed debris that pass through the outside protective layer from reaching the core fibers and cause their destruction by abrasion. Such an arrangement does not protect the outside braiding layer of e.g. nylon or Dacron which rubs against the seabed nor the additional layer of the polyethylene strip which relies on the outside layer for its protection. In other words, it is expected that the polyethylene under-layer to have an inferior abrasion resistance to the outside protective layer.

Therefore, there is a need in the industry for a covering device or a covering material that responds to at least one drawback of what is known in the field. More particularly, there is a strong need for a new covering material or coating allowing the manufacture of a new generation of ropes that can provide high mechanical performance and other useful attributes such as floating capabilities with enhanced abrasion resistance and hence longer service lifetime in smaller diameters and lower weights than currently used traditional ropes.

SUMMARY OF INVENTION

The present invention responds to the above need by providing a covering device or a covering material having: enhanced abrasion resistance properties required in reduced volume; and/or providing floating capability.

More particularly, according to a first preferred aspect, the invention relates to a covering device or a covering material which comprises a braid or woven construction of ultra high molecular weight polyethylene unitary filaments in the form of a tape with continuous and coherent structure of oriented and extended molecular chains connected together by taut molecular entanglements. By tape, we mean an elongated member having a substantially flat cross-section in which the width is much greater than the thickness. While the members may have a high elastic modulus and/or strength, the thickness is sufficiently thin that the material can be bent for shaping and weaving into a covering member around rope, cords and lines having a diameter that is larger than the tape width. Preferred dimensions for such tapes are provided elsewhere in the specification and in specific examples.

According to another preferred aspect, the invention also relates to a cord-like device having enhanced abrasion resistance properties and/or reduced volume and weight and/or floating capability. The cord-like device comprises an interior cord surrounded by an exterior covering including a braid or woven construction of high molecular weight polyethylene unitary filaments in the form of a tape with continuous and coherent structure.

According to another preferred aspect, the invention relates to a cord comprising a plurality of parallel, braided, twisted or woven strands, cables, ropes, wires, coils or laces made of a plurality of parallel, braided, twisted or woven tapes. The tapes comprise high molecular weight polyethylene unitary filaments with continuous and coherent structure.

More preferably, the high molecular weight polyethylene mentioned above has a molecular weight greater than 300,000, and even more preferably greater than 3 millions.

According to another preferred aspect, the invention relates to the use of a covering device as defined above, for covering a cord.

According to another preferred aspect, the invention relates to the use of a covering device as defined above, for covering a conduit or a plurality of conduits.

According to another preferred aspect, the invention relates to a process for the manufacturing of a cord-like device as defined above. The process comprises the steps of:
 a) providing an interior cord; and
 b) applying an exterior covering around the interior cord to form the cord-like device.

These and other features of the present invention will become more apparent from the following description. The above and other objects, effects, features, and advantages of the present invention will become more apparent from the following description of the embodiments thereof taken in conjunction with the accompanying drawings.

BRIEF DESCRIPTION OF THE DRAWINGS

FIG. 6A is a cross-section elevation of another embodiment taken transverse to the principle axis of the cord or rope, whereas FIG. 6B is an enlarged view of the indicated portion of FIG. 6A FIG. 7A-C are cross-sectional elevations of further embodiment of a tape deployed in the cord or rope covering, which in FIGS. 7A and B is taken transverse to the principle axis of the tape, while in FIG. 7C is taking along the principle axis of the tape.

DETAILED DESCRIPTION

Figure 1A:
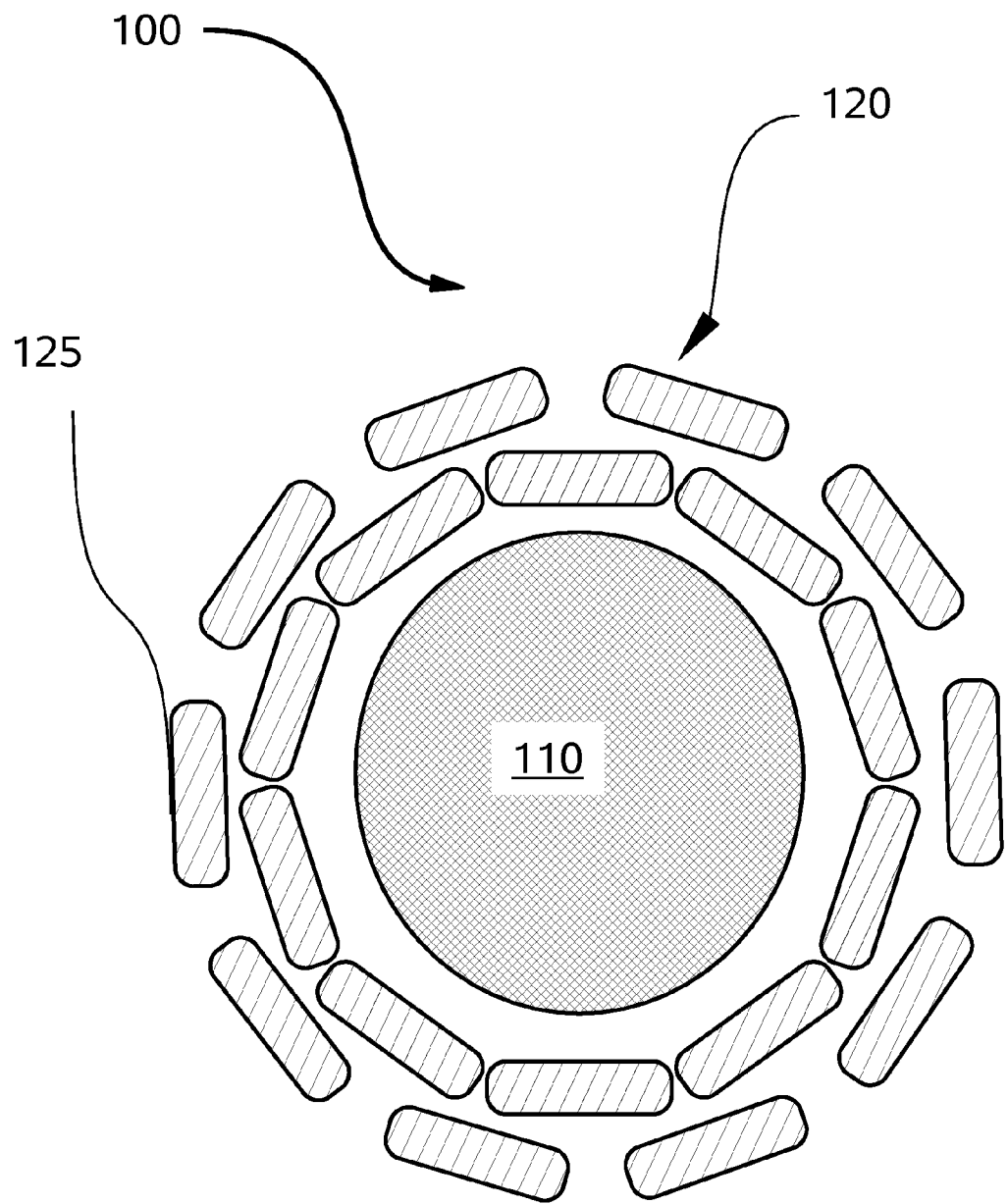
FIG. 1A is a cross-section elevation of a first embodiment taken transverse to the principle axis of the cord or rope.

Referring to FIGS. 1 through 8, wherein like reference numerals refer to like components in the various views, there is illustrated therein a new and improved cord, rope or cable, generally denominated 100 herein.

As stated above, the present invention is first directed to a covering device or a covering material having enhanced abrasion resistance and their respective use for the making of cords or cord-like devices covered by the covering device or covered by the covering material.

The enhanced abrasion resistance is attained by the use of a covering device or material comprising a braided or woven construction of UHMWPE unitary filaments with continuous and coherent structure of oriented and extended molecular chains connected together by taut molecular entanglements unlike the bundles of multifilament fibers known to be currently in use.

UHMWPE, a polyethylene with an ultra high molecular weight, is known to have the highest abrasion resistance among most of the important thermoplastic polymers and metals. Also, within the UHMWPE family of polyethylene, it is known that the abrasion resistance of UHMWPE increases with its molecular weight. Hence, an UHMWPE that is used in the manufacturing of tapes for the exterior covering of braid or woven layer may not necessarily be the same with the UHMWPE that is gel or solution spun for making the high strength core component. The term UHMWPE refers to the UHMWPE as defined by the ASTM-D4020-81 and for the purposes of this application, it includes polyethylenes with a molecular weight of at least 300,000; or higher such as 3 millions or higher.

High strength UHMWPE fibrillar tapes having a continuous coherent structure can be produced from melt crystallized, pseudo-gel and compacted powder precursors as described in prior art U.S. Pat. Nos. 4,587,163; 5,407,623 and 5,479,952, which are incorporated herein by reference. A common characteristic of the processes used in making the UHMWPE unitary is that they do not involve fiber spinning procedures that lead to multifilament fibers. The UHMWPE unitary tapes are made of oriented and extended molecular chains connected by taut molecular entanglements that make the fibrillar tapes coherent and with a continuous structure unlike the multifilament fibers that shred.

Such unitary and fibrillar tapes made of oriented and extended molecular chains connected by taut molecular entanglements were used for constructing different braid forms and ropes.

In alternative, but currently less preferred embodiments the tapes may be formed from HMWPE by melt extrusion in the form of a tape, but more preferably some combination of first melt extrusion and then either drawings or solid sate extrusion through a die having a tape shaped cross section to provide at least some molecular orientation to the polyethylene molecules to increase the strength and abrasion resistance of the tape. Such tapes preferably have a fibrillar structure, but are essentially unitary in the sense that the boundaries between the fibrils and micro-fibrils are not weak and the tape itself does not shred and is abrasion resistant.

It should also be appreciated that terms HMWPE and UHMWPE can also embrace compositions initially formed form lower molecular weight PE that is increased in molecular weight by cross-linking, either by irradiation or chemical cross-linking agent, as for example after extrusion but before or the fabrication to the final dimensions of the tape.

Because of their shape, that is a tape as compared to a bundle of fibers twisted into a substantially bulkier thread, the resultant braid construction of the UHMWPE unitary tape was also substantially thinner, which result in a cord-like device with a reduced weight and diameter. The enhanced abrasion resistance of the UHMWPE unitary tapes reduces the required amount of material for the exterior coating and results in reduced volume and weight.

Braided constructions of UHMWPE unitary tapes exhibit a unique combination of features and properties because of the shape and profile of the tapes, their structure, composition and their properties. The UHMWPE unitary tapes are flat and thin, their width and thickness can be modified for using them with different size ropes and purposes. For example, UHMWPE tapes 3.4 mm wide and with thickness in the range from 0.05 mm to 0.3 mm were used for the fabrication of ropes with diameters in the range from under 10 mm to 30 mm and over. For ropes with larger diameters such as 40-100 mm, the width of the tapes was increased to 7-12 mm, with even larger widths being available. For smaller diameter cords, e.g. less than 10 mm, UHMWPE tapes with widths of 1.7 mm were also used. The width of the tapes could be adjusted by juxtaposing two tapes, e.g. two 6 mm wide tapes acting as a 12 mm wide tape.

The thickness of the UHMWPE tapes could be adjusted also by staggering the tapes on top of each other, thus building a braided structure using unitary tape multi-layers, e.g. for a total thickness of 0.6 mm comprised of two 0.3 mm or three 0.2 mm thick tapes. Multilayer tapes are thin and provide layers of protection against abrasion as well as warnings for certain amounts of wear. When a top layer eventually thins out, there is a second tape layer below it to provide additional abrasion resistance. Additional tape layers can be included for even longer protection. Such multilayer approach is not practical with bundles of multifilament fibers as the outside protective layer becomes extraordinarily thick and heavy.

Another benefit of the flat shape of the UHMWPE unitary tapes is making in situ repairs. The coherent and continuous surface of the tape is a more amenable surface than a multifilament bundle of fibers for attaching adjacent tapes by thermo-mechanical means. Multifilament fibers such as UHMWPE fiber, in general, shrink and loose their mechanical properties when using such means.

The profile of the UHMWPE unitary tapes can also be varied from a smooth surface to a textured surface for increased traction or holding for special purposes. Texture patterns can include various shapes and forms, for example, dimples and indented lines or fish scale patterns which allow holding ability in one or two directions.

The UHMWPE unitary tapes, having a structure of oriented and extended molecular chains that are held together by taut molecular entanglements throughout their structure, exhibit high breaking strengths, e.g. of about 500 MPa and a remarkable elastic response that makes the braided constructions of the UHMWPE unitary tapes strong and dimensionally stable under certain loads and thus able to apply sustainable compressive loads onto the core fibers of a rope. Thus, ropes with outside protective braids of UHMWPE unitary tapes have reduced diameters not only because the UHMWPE tapes are thin, occupy small volume and are not needed in large volume in comparison to the bundles of multifilament fibers, but also because they are strong and also capable of compressing and compacting the core fibers through their elastic deformation (extension) during the braiding process. For example, UHMWPE unitary tapes deform elastically under loads as high as at least 20 MPa, but preferably above 30 MPa, and when such load was to be applied to each of the tape members of the braiding, the compression on the core was very high. Doubling the breaking strength of a rope for the same size or delivering the breaking strength of a rope at half the rope size by using the features and properties of the UHMWPE unitary tapes is possible and can be seen clearly when comparing the breaking loads of a traditional braided rope comprising Dacron for the outside braided protective layer and Dyneema as the core fiber and a rope of the new generation comprising an outside protective braiding of UHMWPE unitary tapes and a core of Dyneema fibers. For example, a ½" diameter rope of double braided polyester with Dyneema core has a breaking strength of 17,000 lbs whereas a rope of this invention with the same diameter has a strength of 31,000 lbs, i.e. a 82% increase. For a ⅜" rope, the increase in strength is 114% (see at the Table below)

| Double Braid Polyester with Dyneema core | | | Braid of UHMWPE unitary tapes with Dyneema core | | |
|---|---|---|---|---|---|
| Diameter (in.) | Core/Sheath | Av. Tensile Strength (lbs) | Diameter (in.) | Core/Sheath | Av. Tensile Strength (lbs) |
| ⅜ | Dyneema Polyester | 8,400 | ⅜ | Dyneema/UHMWPE | 18,000 |
| ½ | Dyneema Polyester | 17,000 | ½ | Dyneema/UHMWPE | 31,000 |

Such ropes appear and behave like cable products, as the outside braiding and the core are "embodied" into one solid product in which there is little relative motion between the different components. An important corollary of such constructions is that they minimize: a) both the internal friction through the restricted motion of the rope components and the barrier properties of the braiding construction of UHMWPE unitary tapes which prevent solid debris of passing through the UHMWPE braiding of the unitary tapes and b) the external abrasion though their outstanding abrasion resistance.

In contrast, the bundles of multifilament fibers in braided ropes are displaced relative to each other, because of their weak lateral bonding and the free space between them, particularly in rope locations of threads passing in cross directions or when the rope is abraded against sharp edges. Such displacement causes significant "fuzzing" (shredding) of the fibers even when polyurethane is used to protect the fibers (Sloan, F., S. Bull, and R. Longerich. "Design Modifications to Increase Fatigue Life of Fiber Ropes." Oceans. 1. (2005): 829-835).

Figure 1B:
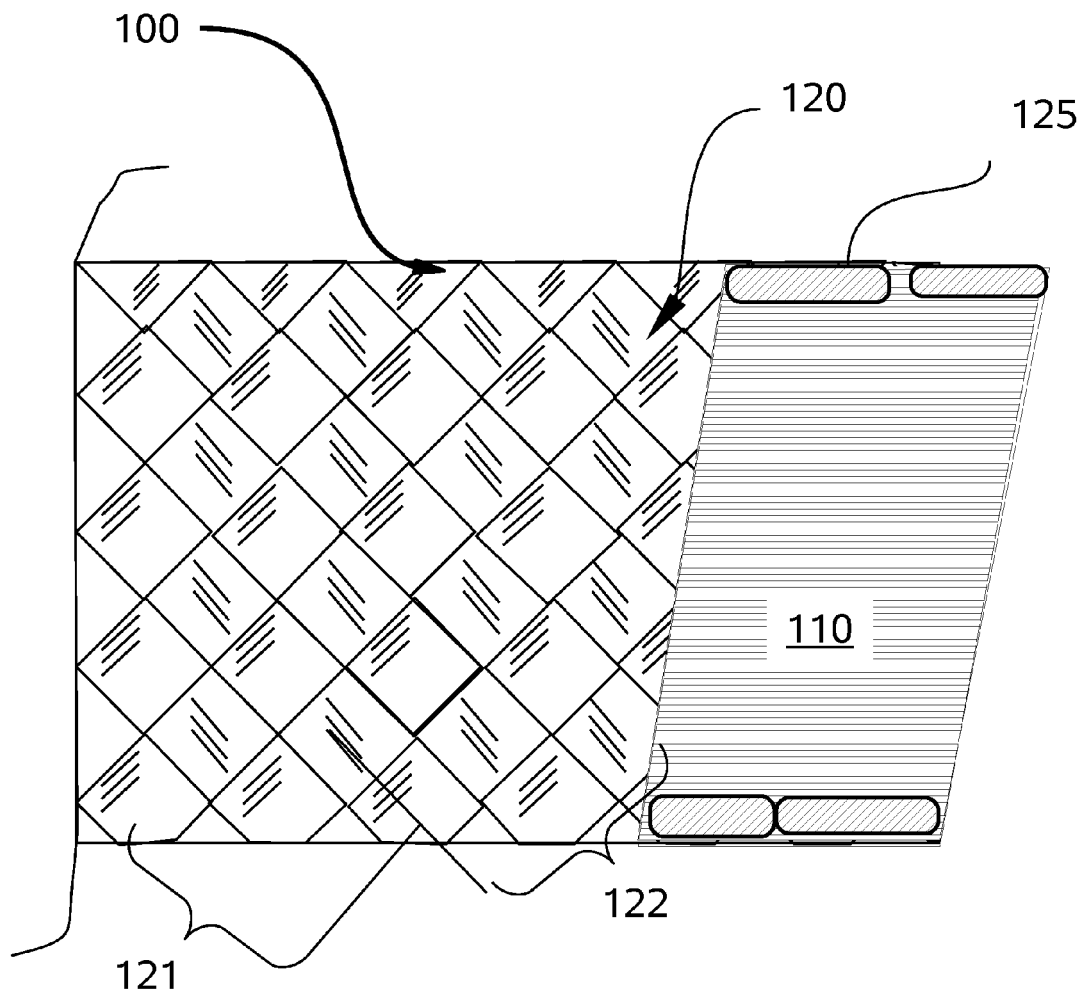
FIG. 1B is a partial cut-away exterior elevation transverse to the cord or rope on FIG. 1A

The present invention relates also to a cord-like device 100 having enhanced abrasion resistance properties as it comprises an interior cord 110 surrounded by an exterior covering 120, as shown in FIGS. 1A and 1B. The exterior covering comprises high molecular weight polyethylene, and preferably UHMWPE.

As further shown in FIG. 1B, the exterior covering of the cord-like device mentioned above is made of a braid or woven construction of ultra high molecular weight polyethylene unitary filaments in the form of a tape 125 with continuous and coherent structure, having at least two sets of parallel tape members 121 and 122 interwoven to alternatively overlap each other, and in this embodiment each set being disposed generally at about 90 degrees to the other set and 45 degrees with respect to the principle or longitudinal axis of the cord 100. It will be appreciated that the angle of the wrapping and the number of layers can be varied from this example without departing from the scope and spirit of the invention as defined in the claims that follow.

The above mentioned cord-like device comprises an interior cord 110. By the term "cord", it has to be understood any sort of linear or longitudinal material such as, but not limited to, strands, ropes, cables, wires, coils, laces or the like. The cord is generally made of a plurality of fibers or tapes, preferably made of a plurality of parallel, braided, twisted or woven fibers or tapes.

Figure 2:
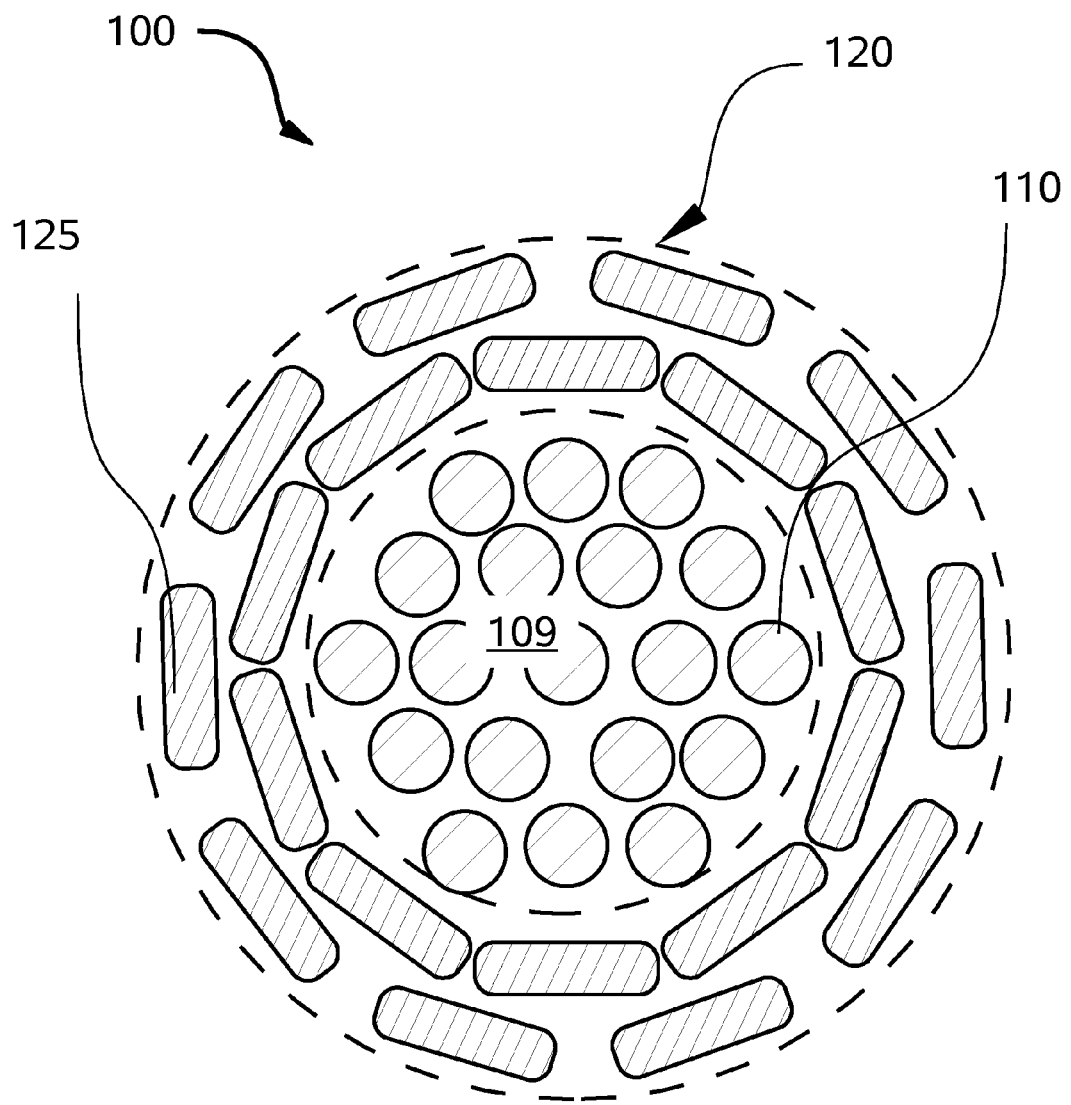
FIG. 2 is a cross-section elevation of another embodiment taken transverse to the principle axis of the cord or rope.

The interior cord 110 may also comprise a plurality of parallel, braided, twisted or woven strands, cables, ropes, wires, coils or laces made of a plurality of parallel, braided, twisted or woven fibers or tapes, generally illustrated as 109 in FIG. 2.

The fibers or tapes may be high strength polymer fibers or tapes, or high strength fibers or tapes made of metal or metal wires.

Figure 3:
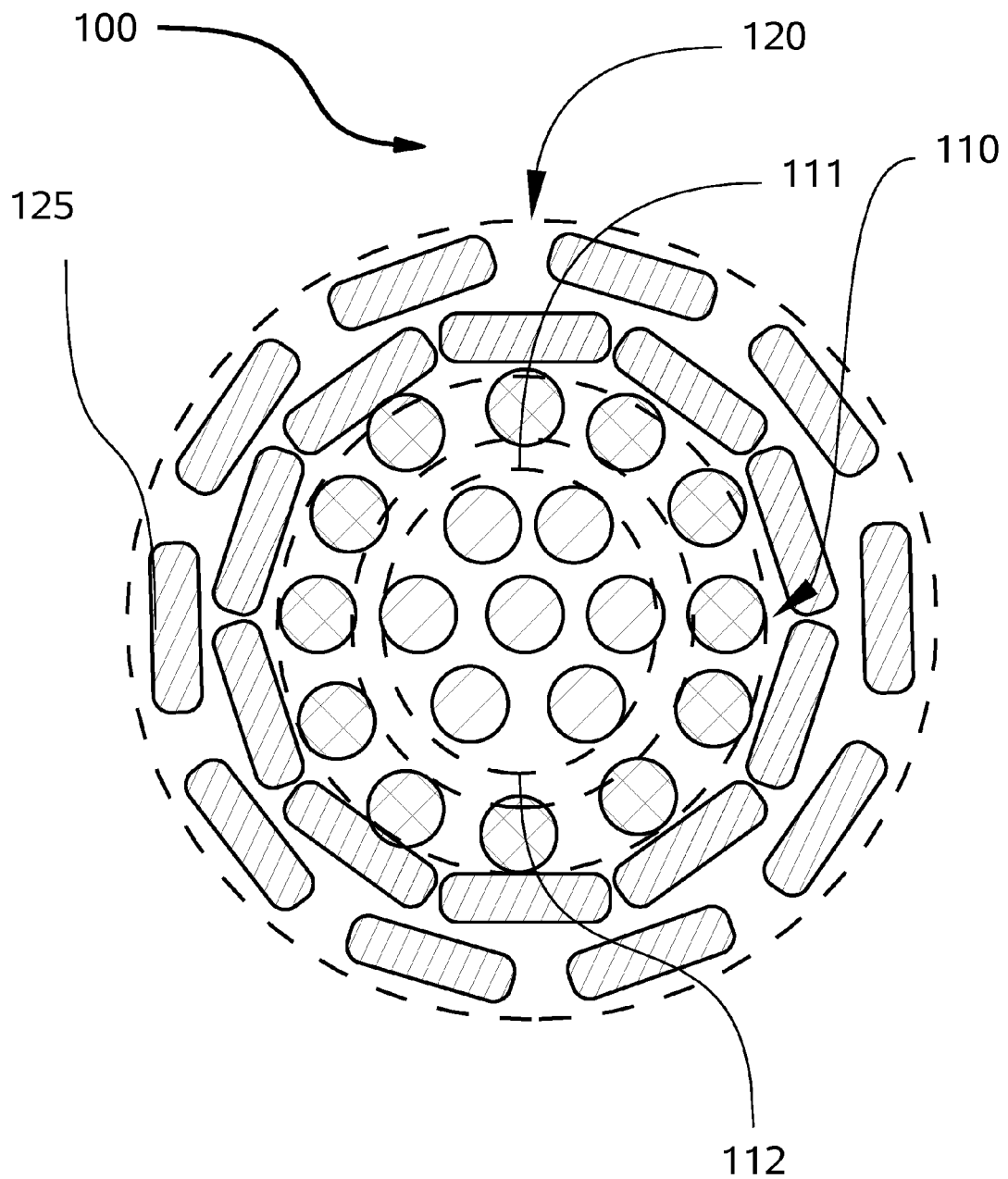
FIG. 3 is a cross-section elevation of another embodiment taken transverse to the principle axis of the cord or rope.

As for example in FIG. 3, the interior cord 110 has a first set of fibers 111 surrounded by a second set of fibers 112 which is then covered by the braided exterior cover of woven HMPE or UHMWPE 125 formed of unitary tapes 120.

The polymer fibers and tapes may be high strength multifilament fibers or tapes comprising at least one polymer selected from; but not limited to, the group consisting of ultra-high molecular weight polyethylene, polyethylene, polypropylene, polyamide, polyester, aromatic polyamide, and aromatic co-polyester.

Figure 4:
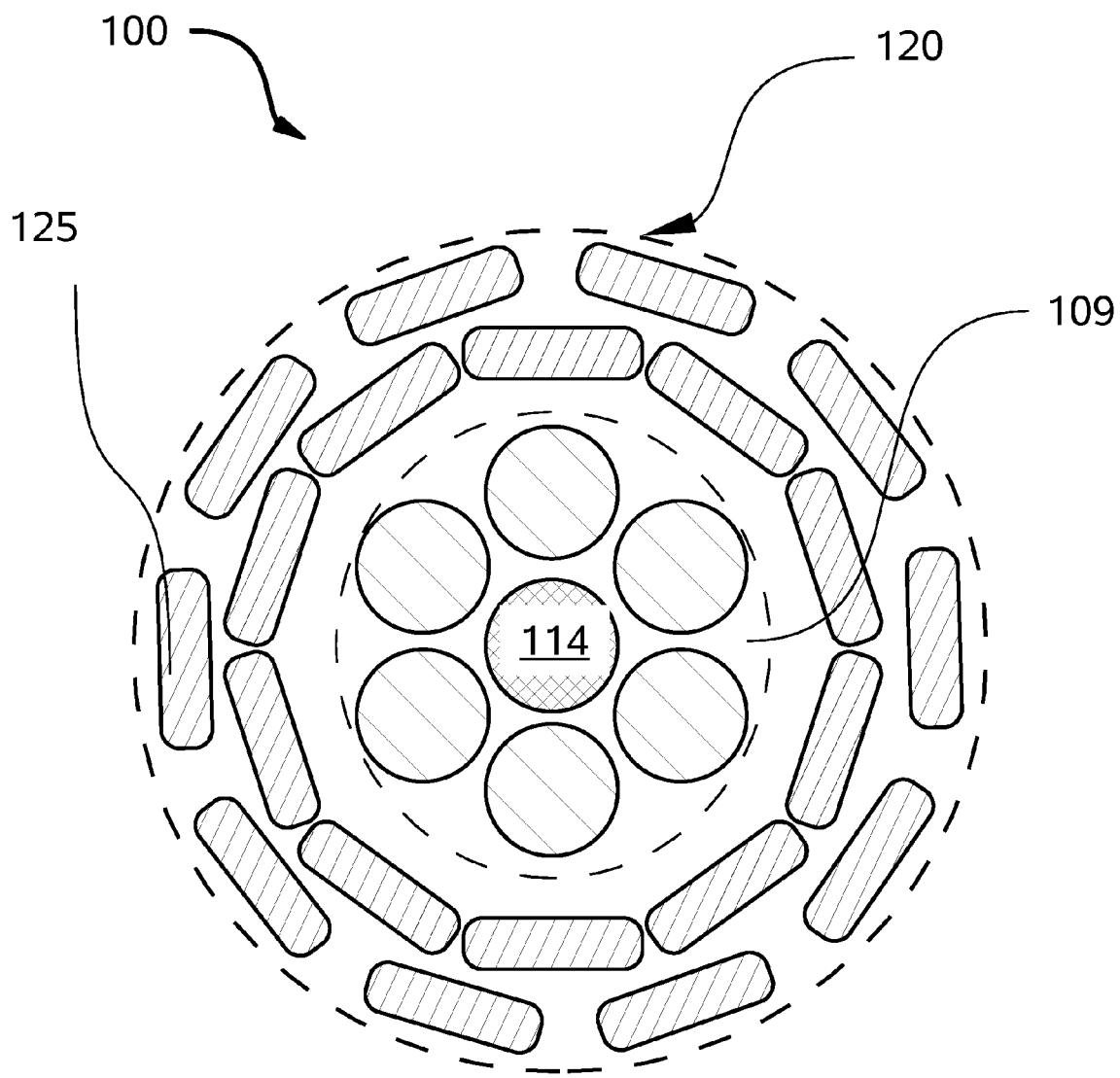
FIG. 4 is a cross-section elevation of another embodiment taken transverse to the principle axis of the cord or rope.

According to another aspect of the present invention, the interior cord may also be an electric or an electronic component. By electric component, it has to be understood any kind of electric conductive material such as a conductive electric cable or wire 114. By electronic component, it has to be understood a television cable, an optic-fiber cable, a coaxial cable, or the like. As for example, as shown in FIG. 4 the electric cable or wire 114 is surrounded by a plurality of parallel, braided, twisted or woven strands, cables, ropes, wires, coils or laces made of a plurality of parallel, braided, twisted or woven fibers or tapes 109 which is which is then covered by the braided exterior cover 120 of woven HMPE or UHMWPE tapes 120.

The interior cord may have a round or flat profile. An example of flat profile may be the use of the covering device or the coating material for covering or coating a HOMI cable or the like (HDMI for "high definition multi media interface").

Figure 5:
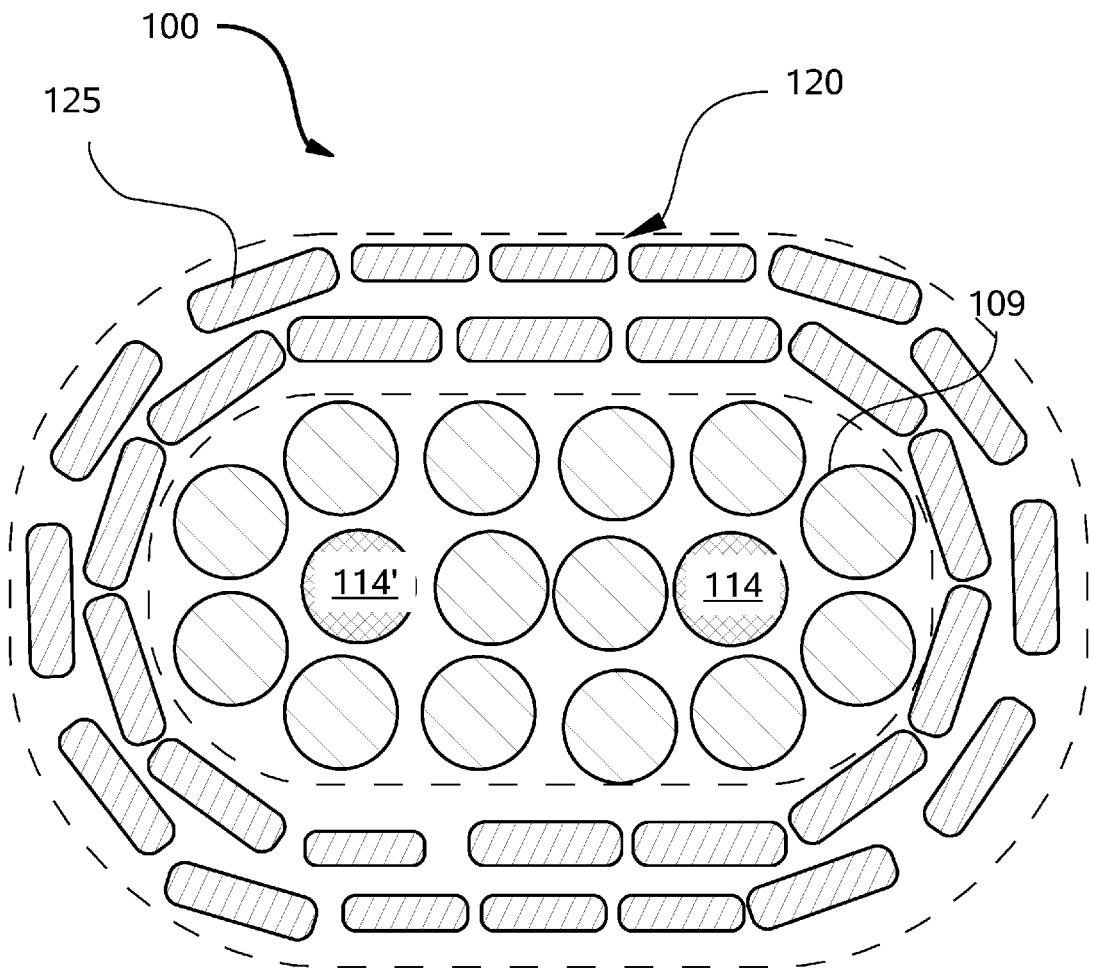
FIG. 5 is a cross-section elevation of another embodiment taken transverse to the principle axis of the cord or rope.

The interior cord may also be a cable wire, which can be used in marine and other applications. As for example, FIG. 5 illustrates a cord 100 that is a cable having two electrical conductors 114 and 114'.

It has to be understood that the cord-like device of the invention may have a round or flat profile.

The covering device may be fully or partially intertwined with the interior core, in order to enhance the cohesion between the inside and outside parts of the cord-like device, enhancing solidity and flexibility of the device, reducing its diameter and enhancing security when it is used. The exterior covering device comprised of UHMWPE unitary tapes will enhance the abrasion resistance over multi-fibrillar fibers, and thus may be thinner and hence lighter for a given abrasion resistance performance thus allowing the construction of ropes of smaller diameter and reduced weight.

According to another aspect, the invention also relates to a cord comprising a plurality of parallel, braided, twisted or woven strands, cables, ropes, wires, coils or laces made of a plurality of parallel, braided, twisted or woven tapes. The tapes comprise high molecular weight polyethylene unitary filaments with continuous and coherent structure, providing to the cord higher strength and resistance.

Preferably, the cord may further comprise fibers and/or tapes made of at least one polymer selected from the group consisting of ultra-high molecular weight polyethylene, polyethylene, polypropylene, polyamide, polyester, aromatic polyamide, and aromatic copolyester.

In other words, the cord of the invention may be made of any sorts of strands or fibers known in the art of cords intermingled with tapes of UHMWPE.

According to another embodiment of the invention a cord or rope having a core comprising a plurality of bundles of multifilament fibers has each bundle wrapped or intermingled with UHMWPE unitary tapes impregnated with e.g. a mineral lubricating oil to further reduce the internal abrasion between the bundles of fibers in the core component.

A more preferred aspect of this embodiment are cord devices 600 with a large diameters, e.g. about 100 mm, which are illustrated in FIGS. 6A and 6B comprising a braided construction of ropes 109 with smaller diameter (e.g. about 9 mm), each such smaller diameter rope made of bundles of multifilament high strength fibers wrapped with a protective cover of UHMWPE braided construction 601 of unitary tapes impregnated 602 with a mineral lubricating oil to further reduce the internal abrasion between crossing members and between the bundles of fibers in the core of each small diameter rope. The amount of lubricating oil in the UHMWPE tapes is in the range of 0.01-10.0% by weight.

Preferably, the UHMWPE unitary tapes deployed in the embodiments of FIGS. 6 and 7 are high strength UHMWPE fibrillar tapes having a continuous coherent structure, which optionally retain a fraction of the oil medium used in the gel forming process to provide the impregnated mineral lubricating oil.

Figure 7A:
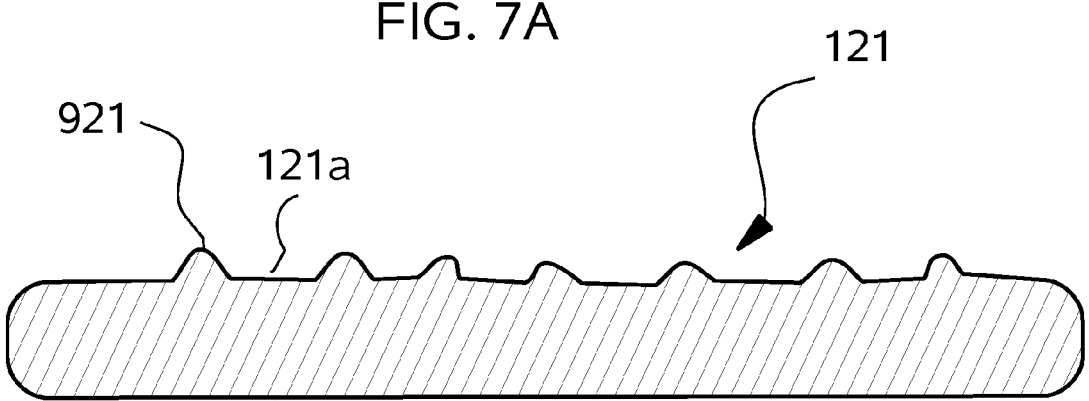
Figure 7B:
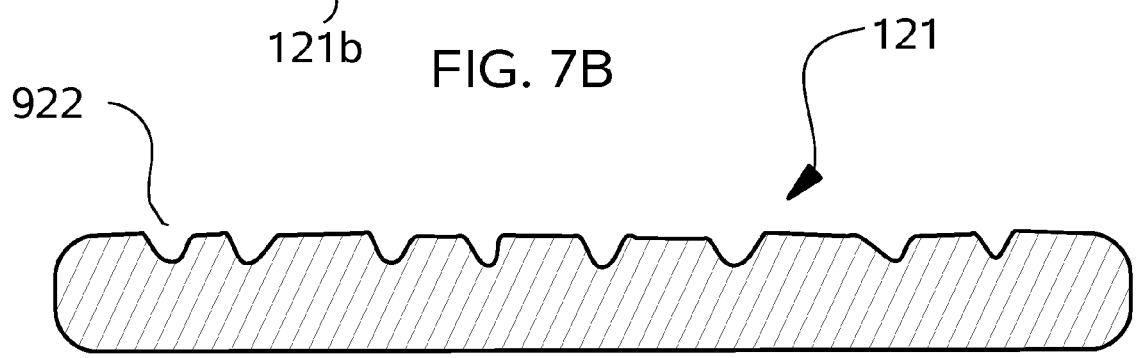
Figure 7C:
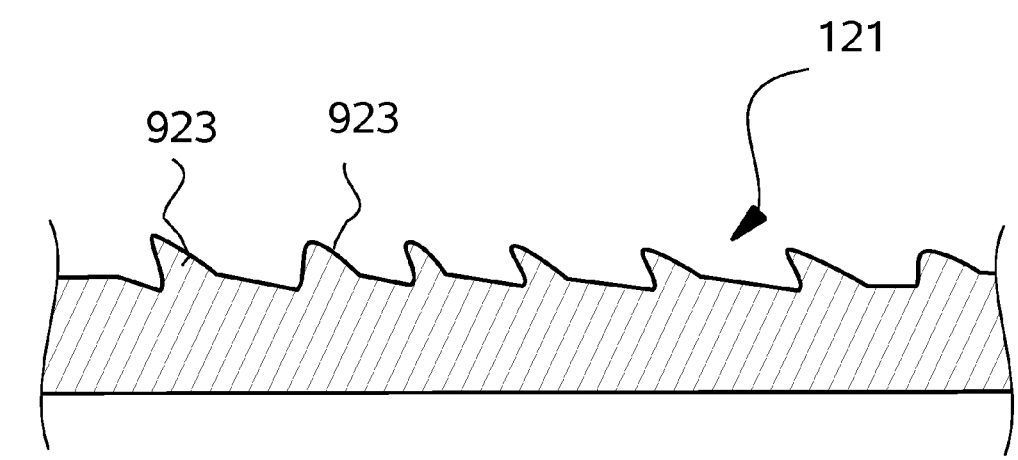

In another aspect of the invention the UHMWPE unitary tapes need not be flat, but can have a desired profile or texture at least on the exterior, as shown in FIG. 7A-C. In FIG. 7A, the texture extends out or bumps or knobs 921 from the top planar surface 121a whereas in FIG. 7B the texture is provide by depressions 922. In FIG. 7C the texture is provided by triangular protrusions 923 that orient in a common direction so that the tape can slip in a forward direction (arrow 901), but be grasped tighter from movement in a backward direction (arrow 902). Although the textures described above are on the upper tape surface 121a, which is intended to be on the outside of the braided covering 120, the textures can be on the upper surface and the lower surface 121b.

It should be appreciated the texture means may comprises any manner or combinations of the deviations from a planar surface that are illustrated in FIG. 7A-C.

To ensure a higher strength, the strands or fibers may be preferably made of at least one polymer selected from the group consisting of ultra-high molecular weight polyethylene, polyethylene, polypropylene, polyamide, polyester, aromatic polyamide, aromatic copolyester and combinations thereof.

The cord of the invention described above may be of course covered by the covering device of the invention to ensure higher abrasion resistance, to reduce the volume of the cord; and in some occasions to provide a floating capability to the cord.

According to another aspect, the invention relates to a process for the making of the cord like device defined above. The process comprises the step of providing an interior core, which can be the cord of the invention (including UHMWPE tapes) or any kind of interior cords known in the art or defined above. The covering device is then applied around the interior cord.

The covering device may have the form of a tape of UHMWPE. The tape is applied around the interior cord as a bandage.

EXAMPLES

As an example of the present invention, a new line of smaller diameter and lighter ropes with superior abrasion resistance in comparison to existing ropes, has been made.

The higher abrasion resistance of the ropes is attained through the incorporation in the rope of an outside braided layer which is constructed with high strength UHMWPE unitary tapes of the type described in this patent application.

A high strength UHMWPE tape of this application is unitary in the form of a narrow strip or filament with a continuous coherent structure in which the fibers are held together intrinsically by molecular entanglements unlike the multifilament fibers obtained by melt for example, solution or gel-spinning and used in rope manufacturing in which the fibers are loose and separate in their lateral directions. It has been found that such unitary UHMWPE tapes are resistant to fibrillation, have a superior abrasion and shredding resistance in comparison to the multifilament fibers of polyamide, polyester, polyethylene, polypropylene and aromatic polyamides and polyesters used in rope manufacturing and can be braided into smaller diameter and lighter constructions.

Other applications for such HMWPE unitary tapes, and more particularly high strength UHMWPE unitary tape is to form biocompatible and durable covering for a medical or bioimplantable cord or device that deploys as the inner member natural tendons or ligaments, as well as biopolymers and synthetic analogs thereof, which may be desirable, for example in spinal applications. Alternatively, such HMWPE unitary tapes, and more particularly high strength UHMWPE unitary tape may be combined in the manner disclosed herein, as well as with other materials, including fibers, for deployment as tendons or ligaments in the above or other applications. Such structures may in fact be shaped to match the natural tissue that it replaces, and is not intended to be limited to structures with constant round, flat or other cross-sectional profiles.

One preferred application of the invention relates to synthetic ligaments and in particular a synthetic ligament for replacing the natural anterior cruciate ligament of the knee joint which can be injured commonly during various activities such as sporting and by sudden movements. The human anterior cruciate ligament experiences loads ranging from over 100N to 700 N (22.5-158 lbs) and tears under loads in the range of about 500 to 1700 N (112.6-382 lbs), as is disclosed in U.S. Pat. No. 4,932,972.

A synthetic ligament device under the teachings of this invention is a cord-like product made of an outside protective braiding of UHMWPE unitary tapes and a core of braided or parallel UHMWPE high strength fibers with the outside braiding applied tightly on the core so that the outside braiding and the core are embodied as one solid flexible cable. Such a cable-like product can be flexed, bent or twisted by torsion and maintain the state of deformation that it is subjected to. A synthetic anterior cruciate ligament in the form described above allows for a more uniform and better distribution of the tensorial, bending and torsional loads that are generated during the joint movement on the high strength fibers in the core which are held compacted together by the outside braiding into a unified body in comparison to synthetic braided ligaments of the prior art in which there is no mechanism for compacting and holding the core fibers in such state during their intended function in the body, as for example in the disclosures of U.S. Pat. Nos. 4,731,084; 4,932, 972; 5,456,722; 4,610,688 and 4,917,699, which are incorporated herein by reference. Synthetic ligament samples based on the cord-like construction described above having a diameter of about 6 mm (which is in the range of the diameter of 4-6 mm of the human anterior cruciate ligament) exhibit an average tensile strength of 4200 lbs, a value that exceeds by far the load conditions encountered in human use.

Braiding constructions of UHMWPE unitary tapes, having the highest abrasion resistance of all other synthetic fibers used for biomedical applications, are the most durable for surface abrasion protection. In addition, because of the tight compaction of the core fibers under the compressive action of the outside braiding, the displacement between the outside braiding and the core fibers is small to cause internal friction and wear of the high strength fibers.

Figure 8:
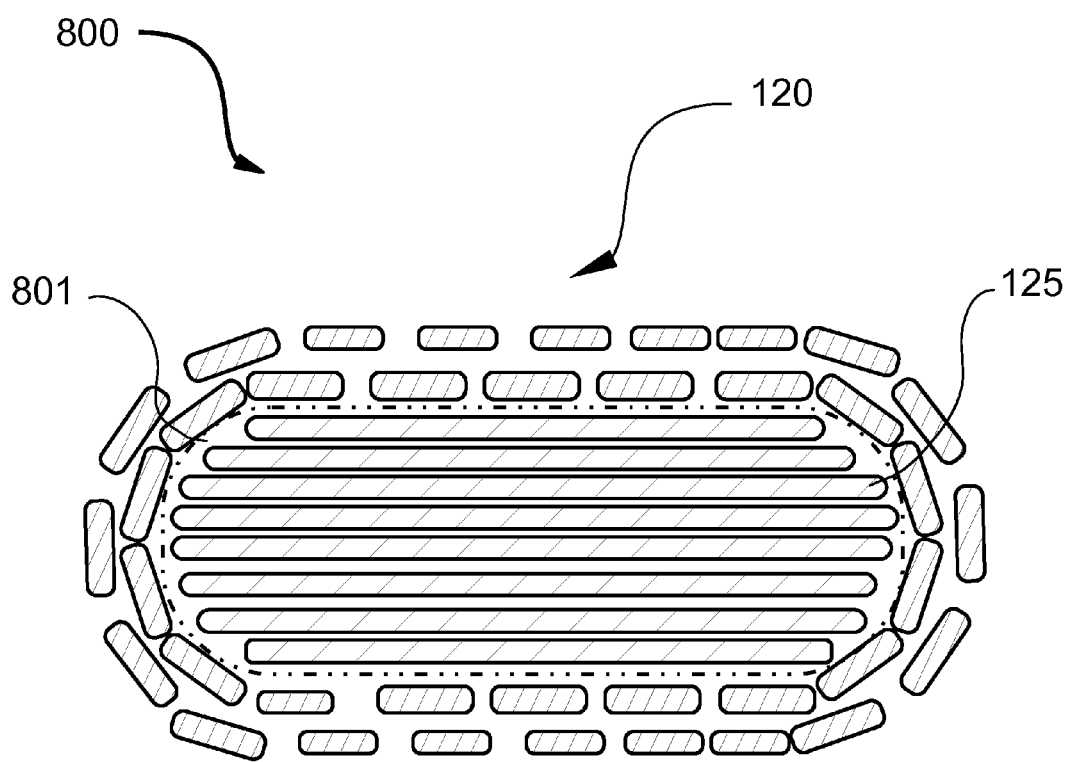
FIG. 8 is a cross-sectional elevation of a further embodiment of the invention in which a core of flat tape is covered by the inventive braid.

Synthetic ligaments with the braiding construction of this invention have been prepared also having a flat profile, that is comprised of a flat braided construction of UHMWPE unitary tapes with a core of UHMWPE high strength fibers or tapes as described in Examples 1 and 5. FIG. 8 illustrates in a cross-sectional elevation transverse to the core of such a synthetic ligament 800 in which a braided covering 120 of UHMWPE high strength tapes covers a core 801 of stacked parallel UHMWPE high strength tapes 125. The ends of the ligaments can be spliced, sawed or fit to interlocking devices for their fixation on the bones.

For example, a braid construction of UHMWPE tape 0.05 mm thick and 3.00 mm wide had a total thickness of 1.00 mm. The thickness of the braid construction could be modified with the thickness of the UHMWPE tape that was used, the number of tapes incorporated in the braid structure in twisted or untwisted form and the braiding pattern.

Ropes made with fibers of ultra high molecular weight polyethylene and aromatic polyamides and polyesters have superior strength to weight performance as compared to metal wires. However, their strength is reduced with abrasion wear, chaffing and soil and dirt contamination and requires a sheath or cover with abrasion resistance to protect the high strength core component or the rope itself. Protection of such high performing fibers with an abrasion resistant braided construction of UHMWPE unitary tapes of this invention is beneficial against external and other environmental factors.

This invention also relates to the use of high strength UHMWPE unitary tapes in woven, braided and knitted structures, such as:

a. A woven webbing product in which the structural element is a unitary fibrillar tape of UHMWPE (as compared to a multifilament UHMWPE fibrillar product).

b. A woven webbing product comprised of two outside layers made of woven webbings of UHMWPE in which the structural element is a unitary fibrillar tape or a multifilament fiber and one internal multilayer component that is comprised of uniaxially oriented UHMWPE fibrillar reinforcing tapes, the total layered structure when bound together having an enhanced load bearing capacity that depends on the load bearing performance of the two outside woven layers and the number of the UHMWPE reinforcing tapes comprising the internal multilayer component.

c. A woven webbing product comprised of two outside layers of woven webbings of a polymer multifilament fiber such as a polyamide, polyester, polypropylene and an internal multilayer component that is comprised of UHMWPE fibrillar reinforcing tapes, the total layered structure when bound together having an enhanced load bearing capacity that depends on the load bearing performance of the outside woven layers and the number of the number of the UHMWPE reinforcing tapes comprising the inside multilayer component.

d. A homogeneous braided or woven product, comprised of a continuous outside sheath of an UHMWPE unitary tape or multifilament fiber and a core multilayer comprised of a plurality of UHMWPE fibrillar reinforcing tapes, in twisted or untwisted form, having an enhanced load bearing capacity that depends on the load bearing performance of the outside sheath layer and the number of the UHMWPE reinforcing tapes that comprise the core.

e. A homogeneous braided or woven product comprised of a continuous exterior sheath of a UHMWPE unitary tape or multifilament fiber and a core multilayer comprised of a plurality of high strength tapes, such as aromatic polymers such as Vectran®.

The concentration of the UHMWPE in the sheath as well as the width of the UHMWPE tape can be varied to adjust the abrasion resistance of the braided product to meet various requirements. A sheath made of 100% UHMWPE tape has a superior abrasion resistance compared to a sheath made with 30% UHMWPE and 70% polyester. A braided product with a large diameter will have a better abrasion resistance when the UHMWPE tape in the sheath is wider e.g. 2.5 mm as compared to 1.0 mm.

The load bearing capacity of the tape reinforced woven and braided structures, varies with the number of the tape elements used. The UHMWPE tapes can be made to stand various breaking loads. Assuming that a given UHMWPE tape breaks under a load of 100 Lbs, then a woven or braided structure comprised of ten tapes for reinforcement or load-bearing purposes can be made to break at 1000 lbs, excluding the load bearing capacity of the two woven external layers or the braided sheath surrounding the UHMWPE reinforcing tapes. Considering that each of the two external braided layers can have a breaking load of 250 Lbs, the breaking performance of the entire braided structure is 1500 Lbs. for a small thickness increase of 0.5 mm.

Such woven structures have the following features: Enhanced load bearing performance, High load bearing performance to weight ratio, Superior abrasion resistance, Not water absorbing, Chemical Resistance and UV Resistant.

The covering device of the invention may be used for: ropes, cord, protective sheath for ropes, lines, belts, webbings, protective siding, electronic components, and the like.

Example 1

Example 1. In one experiment a rope was made with a protective braided layer of UHMWPE unitary tapes (0.05 mm thick and 3.4 mm) wide on a core of braided high strength UHMWPE fibers having a diameter of 0.375 in. The weight of the protective UHMWPE braided construction was 10% of the total rope weight. The outside protective braiding of the UHMWPE unitary tapes was braided tightly on the core of the rope and had the same diameter as the core component. Samples of the rope were tested for their abrasion resistance in comparison to the braided core of high strength UHMWPE fibers for the same length of time, for example, 10 hours. The abrasive material had a surface roughness of 68 micrometers. The rope samples were held under tension against the abrasive material that came in contact with the rope samples with a periodicity of 60 cycles/minute.

The abrasion resistance of the samples was assessed by the weight loss of the rope, the amount of dust trail of worn material on the abrasive and the amount of shredding that was generated during the test. The rope samples with the protective braiding of the UHMWPE unitary tapes maintained their firmness throughout the test and abraded very slowly and over a narrow contact area as was manifested by a small and narrow dust trail of UHMWPE particles on the abrasive material. The thickness of the UHMWPE unitary tapes of the outside braiding that came in direct contact with the abrasive material was somewhat reduced without the occurrence of any shredding or any other onset of failure.

In comparison, the samples of the braided core of high strength UHMWPE fibers without the outside protection changed shape, became flatter against the abrasive material and were abraded and failed by shredding and breaking the fibers of the multifilament bundles over a broader contact area as was suggested also by the wider dust trail on the abrasive material. Unlike other high strength fibers such as nylon and polypropylene which shredded and generated a lot of wear debris and exhibited a large weight loss at the same time (see below), these unprotected samples shredded but being more abrasion resistant they exhibited a smaller weight loss. On the basis of weight loss the rope samples with the protective braiding of the UHMWPE unitary tapes were 1.4× more abrasion resistant over the unprotected braided core samples of the high strength fibers discounting their shredding. It is interesting that the two structures of chain oriented and extended molecular chains of UHMWPE that is one unitary the other multifilament fiber, show different modes of abrasion and wear out to different extent under the same testing conditions.

Example 2

A braid construction with the unitary UHMWPE tape of this invention (0.05 mm thick and 3.0 mm wide) was used as an outside layer to a high strength core component of braided aromatic polyamide (Kevlar®) fibers having a diameter of 0.5 in (12.7 mm). The UHMWPE tapes were braided snugly over the Kevlar® core component. The resultant rope product had a diameter 0.33 in (8.38 mm), was firm and looked like a wire cable.

With the strength of the Kevlar® core unchanged, the rope product featured the combined properties of the excellent mechanical properties of Kevlar® in terms of breaking strength, low extension and negligible creep with the superior abrasion wear resistance of the exterior UHMWPE braided component that Kevlar® lacks.

Example 3

A braid of unitary UHMWPE tapes of this invention (0.05 mm thick and 3.0 mm wide) was used over a 0.5 in. (12.7 mm) double braided Nylon rope construction. The weight fraction of the UHMWPE exterior component was approximately 9% of the total rope weight. The combination of the UHMWPE braided structure of this application over the double braided nylon allowed the production of a floating rope featuring the good shock absorbing characteristics and high elongation of the nylon core with the superior abrasion resistance, excellent UV resistance and non-water absorption behavior of UHMWPE. The weight of the protective UHMWPE braided construction was 9% of the total rope weight. The outside protective braiding of the UHMWPE unitary tapes was braided tightly on the double braided nylon rope, and had the same diameter as the double braided Nylon rope before braiding it with the UHMWPE unitary tapes. Samples of the rope were tested for their abrasion resistance in comparison to the double braided Nylon rope of the same diameter and for the same length of time (10 hours). The abrasive material had a surface roughness of 68 micrometers. The rope samples were held under tension against the abrasive material that came in contact with the rope samples with a periodicity of 60 cycles/minute.

As in Example 1, the abrasion resistance of the samples was assessed by the weight loss of the rope, the amount of dust trail of worn material on the abrasive material and the amount of shredding that was generated during the test. The Nylon rope samples with the protective braiding of the UHMWPE unitary tapes maintained their firmness throughout the test, and abraded very slowly and over a narrow contact area as was manifested by a small and narrow dust trail of UHMWPE particles on the abrasive material. The thickness of the UHMWPE unitary tapes of the outside braiding that came in direct contact with the abrasive material was somewhat reduced without the occurrence of any shredding or other onset of failure.

In comparison, the samples of the double braided Nylon rope without the outside protection changed shape, became flatter as they were squeezed under tension against the abrasive material. They failed by shredding and breaking the fibers of the multifilament bundles over a broader contact area as was suggested also by the wider dust trail on the abrasive material and generated a lot of wear debris. On the basis of weight loss the rope samples with the protective braiding of the UHMWPE unitary tapes were 5.5× more abrasion resistant over the unprotected double braided Nylon rope samples.

Example 4

A braid of unitary UHMWPE tapes (0.05 mm thick and 3.0 mm wide) was used over a 0.5 in (12.7 mm) double braided multifilament polypropylene construction. The combination of the UHMWPE braided structure of this application over the double braided multifilament polypropylene core allowed the production of non-water absorbing and light floating rope also featuring superior abrasion resistance and excellent UV resistance that polypropylene lacks on its own.

The weight of the protective UHMWPE braided construction was 10% of the total rope weight. The outside protective braiding of the UHMWPE unitary tapes was braided tightly on the double braided polypropylene rope, and had the same diameter as the double braided polypropylene rope before braiding it with the UHMWPE unitary tapes. Samples of the rope were tested for their abrasion resistance in comparison to the double braided polypropylene rope of the same diameter using the same abrasion test conditions that were used in Examples 1 and 3.

The polypropylene rope samples with the protective braiding of the UHMWPE unitary tapes maintained their firmness throughout the test, and were abraded very slowly and over a narrow contact area as was manifested by a small and narrow dust trail of UHMWPE particles on the abrasive material. The thickness of the UHMWPE unitary tapes of the outside braiding that came in direct contact with the abrasive material was somewhat reduced without any shredding or other form of failure.

In comparison, the samples of the double braided polypropylene rope without the outside protection changed shape, became flatter as they were squeezed under tension against the abrasive material. They failed by shredding and breaking the fibers of the multifilament bundles over a broader contact area as was suggested also by the wider dust trail on the abrasive material and generated a lot of wear debris. On the basis of weight loss the rope samples with the protective braiding of the UHMWPE unitary tapes were 11.5× more abrasion resistant over the unprotected double braided Nylon rope samples.

Accelerated abrasion testing was performed on various constructions with and without the UHMWPE tape cover of this invention under load against rotated abrasive surfaces with roughness exceeding 60 micrometers. Ropes with an outside braid construction of unitary UHMWPE tapes of this invention outperformed all ropes in which the outside braid was constructed of a traditional fiber such as nylon, polypropylene, and even Dyneema®. The weight loss of a rope of this invention was about 6.5 times less in comparison to a rope with an outside braid of nylon, about 8.4 times less in comparison to a rope with an outside braid of polypropylene and about 1.5 times less in comparison to a Dyneema® construction over the same length of time, 10 hours testing time for example. Notably, the UHMWPE tapes did not fray during this test, while all the other constructions did. Accordingly, it is expected the actual useful life of the inventive product will greatly exceed comparable uncovered ropes by a much greater factor than the above weight loss ratios. The accelerated tests with and without the protecting braids of the UHMWPE unitary tapes show that ropes with such protective braidings outperform all the traditional multifilament fibers used in rope manufacturing. Multifilament fibers begin to shred fast with abrasion whereas the UHMWPE unitary tapes show no signs of failure even after 10 hours of testing under the same abrasion conditions.

Example 5

Hollow braid constructions of unitary UHMWPE tapes were prepared in different diameters, e.g. 0.375, 0.5 and 1.0 in (9.52; 12.7 and 25.4 mm), for covering three strand ropes and other linear products e.g. cables, cords, strands of fibers, pluralities of tapes, and wires and protecting them from wear.

For example, a flexible tubular braid or woven construction of unitary UHMWPE tapes with a diameter of approximately 1 in. was used as the outside layer to make flat "braid-on-core" constructions in which the core was comprised of a number of high strength UHMWPE tapes assembled into a flat multilayer structures from a few to a large number of layers instead of the traditional strands or threads of high strength fibers with round cross section. Using UHMWPE tape that was less than 0.002 in. (0.05 mm) thick and had a breaking strength of for example 100 lbs, a very thin and light flat braid-on-core construction was made in which the core made of a multilayer structure of for example 20 layers, had a breaking load performance of 2000 lbs. The high strength core component could be made with different pluralities of high strength UHMWPE tapes, 5, 10, 20 and higher number of tape layers and incorporates tapes of different polymers for different performances. Flat "braid-on-core" structures can be useful in the manufacturing of thin and strong line products such as slings.

The development of strong, light weight and small diameter ergonomic ropes combining the superior abrasion resistance characteristics of the braided constructions with the unitary UHMWPE tapes of this invention with core components of high strength fibers can be valuable for various uses and applications where external and environmental factors degrade the strength of the rope, and where space and weight limitations are issues of consideration.

Webbings are used commonly for various load-bearing applications such as seat belts, outdoor gear and equipment, belts and tightening straps and in lifting operations such as for pipes, lumber and boats. The load-bearing performance of the webbing depends on the strength of the multifilament fiber and the webbing pattern.

Traditionally webbings are made by weaving multifilament fibers of polyamides, polyesters, polypropylene or in combination with fibers of high strength such as aromatic polyamides (such as Kevlar®) for improving the load-bearing performance of the webbing.

Example 6

Laminates

Laminate structures are a form of composite structures combining certain mechanical performance. For enhanced mechanical performance, the laminates are reinforced with traditional and high performance multifilament fibers, which are laid in various patterns and configurations between the laminating layers.

The laminate structures of the present invention relates to the use of unitary fibrillar reinforcing tapes of UHMWPE for the reinforcement of composite structures. More particularly, the laminate structures comprised of one or more layers of thermoplastic non-woven or woven sheet and one or more layers of unitary uniaxially oriented UHMWPE fibrillar reinforcing tapes in woven and nonwoven form.

A feature of the unitary UHMWPE reinforcing tapes is that the fibers in their fibrillar structure are bound intrinsically together without voids between the fibers and without the need for binding media. This allows the construction of less bulky and more flexible laminate structures. Said reinforcement tapes are less susceptible to fraying than multifilament reinforcing fibers.

Having a larger surface area, the said reinforcing tapes promote better adhesion in comparison to multifilament fibers. UHMWPE reinforcing tapes have widths from 0.1 mm to over 25 mm and greater. In addition, they distribute working loads more uniformly and prevent more effectively the tearing of the non-woven or woven sheet that they are reinforced.

One example of such laminate consists of two Mylar® sheets with said reinforcing tapes in between, the layers being bound with adhesive. Another example involves a woven sheet, such as that of Nylon or polyester, with said reinforcing tapes attached to or sandwiched in between.

Reinforcing tapes may be used alone or in combination with other reinforcing monofilament or multifilament fibers such as Kevlar®. They can also be used with thermosetting types of polymers for more rigid composite structures. Applications of the materials and constructions include: sails, fabric reinforcement, technical apparel outdoor gear, cargo siding and covering, coverings, reinforced plastic paneling among others.

Although the present invention has been explained hereinabove by way of preferred embodiments thereof, it should be pointed out that any modifications to this preferred embodiment within the scope of the appended claims is not deemed to alter or change the nature and scope of the present invention. For example, the cover can be applied or braided under different degrees of tension to fit loosely or tightly and thereby give different degrees of flexibility and rigidity to the cord.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

We claim:

1. A cord device comprising at least one interior cord surrounded by an exterior covering, said exterior covering comprising a braided construction of at least one layer of a uniaxially oriented UHMWPE unitary tapes having a continuous and coherent structure, in which each tape is braided under a tension of at least about 20 MPa to tightly compress the interior cord to a diameter smaller than the initial diameter.

2. A cord according to claim 1 in which the UHMWPE unitary tape is capable of elastic deformation under loads of at least about 20 MPa.

3. A cord according to claim 2 in which the UHMWPE unitary tape has a breaking strength of at least about 500 MPa.

4. A cord according to claim 1 wherein the exterior covering has a thickness of no more than about 10% of the interior cord and provides a reduction in flexibility of the cord device that is less than the initial flexibility thereof in the absence of the exterior covering.

5. A cord according to claim 4 in which the tape has a breaking strength of at least about 500 MPa.

6. A cord according to claim 1 in which the braid is applied tightly to reduce the diameter of inner cord to a smaller diameter than the initial diameter thereof in which the tape forming the braid has a width of at least 1 mm.

7. A cord according to claim 1 wherein the exterior covering has a thickness of no more than about 10% of the interior cord and is operative to compress the interior cord to provide an increase of at least about 45% in breaking strength of the cord in comparison to a cord the uncompressed interior cord of the same diameter having an uncompressed interior cord in the absence of the exterior covering.

8. A laminate structure comprised of one or more layers of a flat tape that is surrounded on opposing lateral surfaces by a braided construction of at least one layer of a uniaxially oriented UHMWPE unitary tape having a continuous and coherent structure in which the unitary tape coherence precludes the incorporation of multifilament fibers formed by fiber spinning.

9. A laminate structure according to claim 8 in which the UHMWPE unitary tape has a width of at least 1.0 mm and thickness of at least about 0.05 mm.

10. A laminate structure according to claim 8 in which the UHMWPE unitary tape has a thickness of no more than about 0.3 mm.

* * * * *